United States Patent
Kang et al.

(10) Patent No.: US 7,379,262 B2
(45) Date of Patent: May 27, 2008

(54) HIGHER-ORDER STATE ESTIMATOR FOR LOW TMR IN HARD DISK DRIVES

(75) Inventors: Chang-Ik Kang, Fremont, CA (US); Yungfeng Li, Fremont, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/586,965

(22) Filed: Oct. 25, 2006

(65) Prior Publication Data

US 2008/0100955 A1   May 1, 2008

(51) Int. Cl.
   *G11B 5/596* (2006.01)
(52) U.S. Cl. .................................. 360/78.09
(58) Field of Classification Search ............ 360/78.09, 360/75, 77.08, 77.01, 78.04, 78.06, 77.11, 360/77.05, 77.04; 318/432
   See application file for complete search history.

(56) References Cited

U.S. PATENT DOCUMENTS

| | | | | |
|---|---|---|---|---|
| 5,023,733 | A | * | 6/1991 | Koga et al. ............... 360/77.04 |
| 5,184,257 | A | * | 2/1993 | Koga et al. ............... 360/77.05 |
| 5,576,909 | A | * | 11/1996 | Dierkes et al. ........... 360/78.09 |
| 5,886,846 | A | * | 3/1999 | Pham et al. .............. 360/78.04 |
| 6,486,629 | B2 | * | 11/2002 | Kato et al. ................... 318/432 |
| 6,940,685 | B2 | * | 9/2005 | Chrappan Soldavini et al. . 360/78.06 |
| 2002/0054451 | A1 | * | 5/2002 | Moon et al. ............. 360/78.06 |

* cited by examiner

*Primary Examiner*—Fred Tzeng
(74) *Attorney, Agent, or Firm*—Ben J. Yorks; Irell & Manella LLP

(57) ABSTRACT

A hard disk drive with a servo circuit that provides a control signal to a voice coil motor to perform a servo to align a head with a disk track of the drive. The servo circuit includes a fifth order state estimator that provides five estimates that are used to create the control signal. The fifth order state estimator may incorporate a first flexible mode of the voice coil motor to calculate the estimates.

14 Claims, 5 Drawing Sheets

HIGHER-ORDER STATE ESTIMATOR FOR LOW TMR IN HARD DISK DRIVES

BACKGROUND OF THE INVENTION

1. Field of the Invention

The present invention relates to a servo of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Information is typically stored in radial tracks that extend across the surface of each disk. Each track is typically divided into a number of segments or sectors. The voice coil motor and actuator arm can move the heads to different tracks of the disks.

FIG. 1 shows a typical track that has a number of fields associated with each sector. A sector may include an automatic gain control ("AGC") field 1 that is used to adjust the strength of the read signal, a sync field 2 to establish a timing reference for the circuits of the drive, and ID 3 and Gray Code 4 fields to provide sector and track identification.

Each sector may have also a servo field 5 located adjacent to a data field 6. The servo field 5 contains a plurality of servo bits A, B, C and D that are read and utilized in a servo routine to position the head 7 relative to the track. By way of example, the servo routine may utilize the algorithm of ((A-B)-(C-D)) to create a position error signal ("PES"). The PES is used to create a drive signal for the voice coil motor to position the head on the track.

The servo system typically utilizes a feed forward control loop that reduces the convergence time required to center the head onto the track. The feed forward control loop may include a state estimator that provides three estimates: an estimate on head position, an estimate on head velocity and a bias estimator. Third order state estimators have limited bandwidth and marginal stability. It would be desirable to expand the bandwidth of the servo while maintaining stability.

BRIEF SUMMARY OF THE INVENTION

A hard disk drive with a servo circuit that provides a control signal to a voice coil motor to perform a servo to align a head with a disk track of the drive. The servo circuit includes a fifth order state estimator that provides five estimates that are used to create the control signal.

DETAILED DESCRIPTION

Described is a hard disk drive with a servo circuit that provides a control signal to a voice coil motor to perform a servo to align a head with a disk track of the drive. The servo circuit includes a fifth order state estimator that provides five estimates that are used to create the control signal. The fifth order state estimator may incorporate a first flexible mode of the voice coil motor to calculate the estimates.

Figure 2:
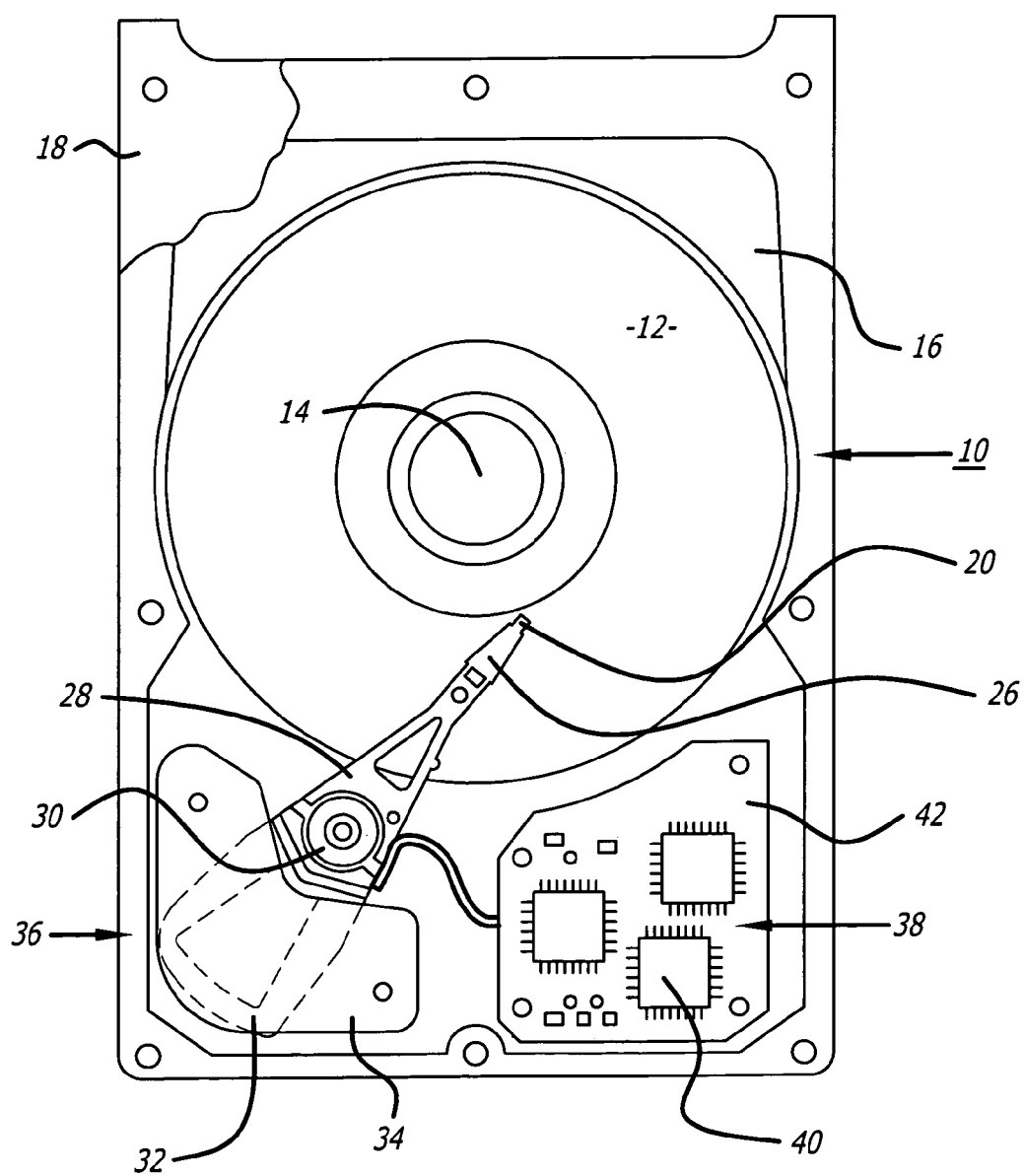
FIG. 2 is a top view of an embodiment of a hard disk drive.

Referring to the drawings more particularly by reference numbers, FIG. 2 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements. The write element magnetizes the disk 12 to write data. The read element senses the magnetic fields of the disks 12 to read data. By way of example, the read element may be constructed from a magneto-resistive material that has a resistance which varies linearly with changes in magnetic flux.

Each head 20 may be gimbal mounted to a suspension arm 26 as part of a head gimbal assembly (HGA). The suspension arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes one or more integrated circuits 40 coupled to a printed circuit board 42. The printed circuit board 40 is coupled to the voice coil 32, heads 20 and spindle motor 14 by wires (not shown).

Figure 3:
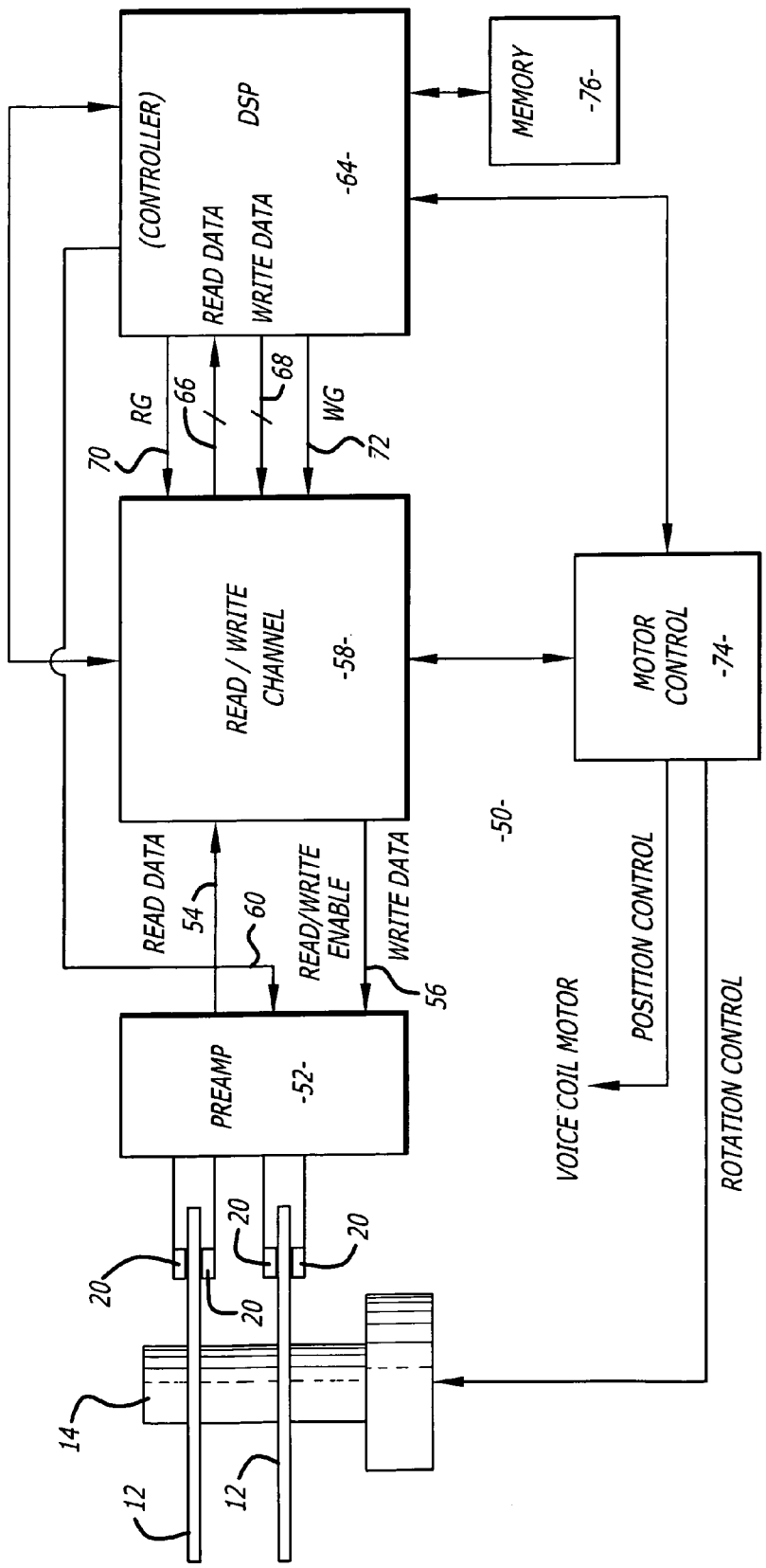
FIG. 3 is a schematic of an electrical circuit for the hard disk drive.

FIG. 3 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read-only memory ("ROM") that contains instructions that are read by the controller 64.

Figure 1:
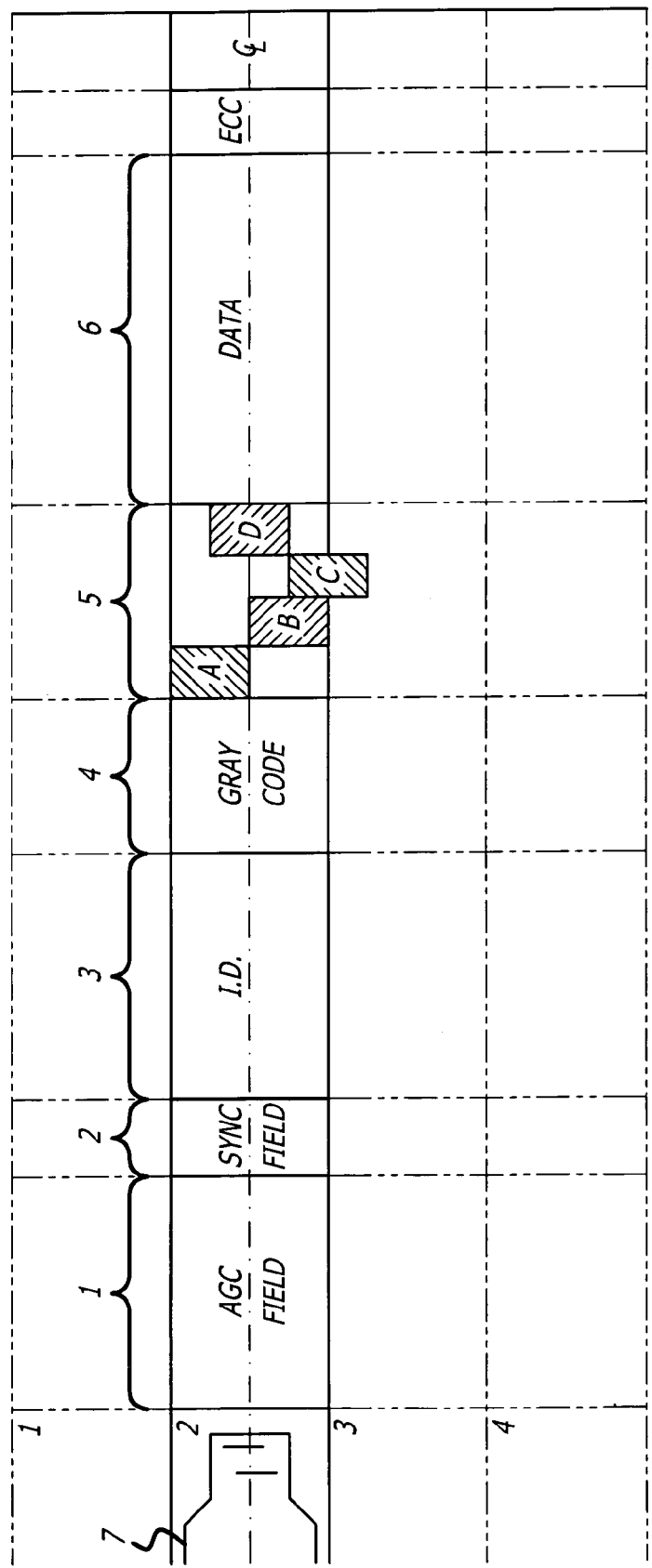
FIG. 1 is an illustration of a track of the prior art.

Each sector of a disk track typically has servo bits A, B, C and D as shown in FIG. 1. The controller 64 may operate a servo routine utilizing the servo bits to position the head relative to the track. The head is moved in accordance with a position error signal ("PES"). The PES reflects the difference between a target position and the actual position of the head.

Figure 4:
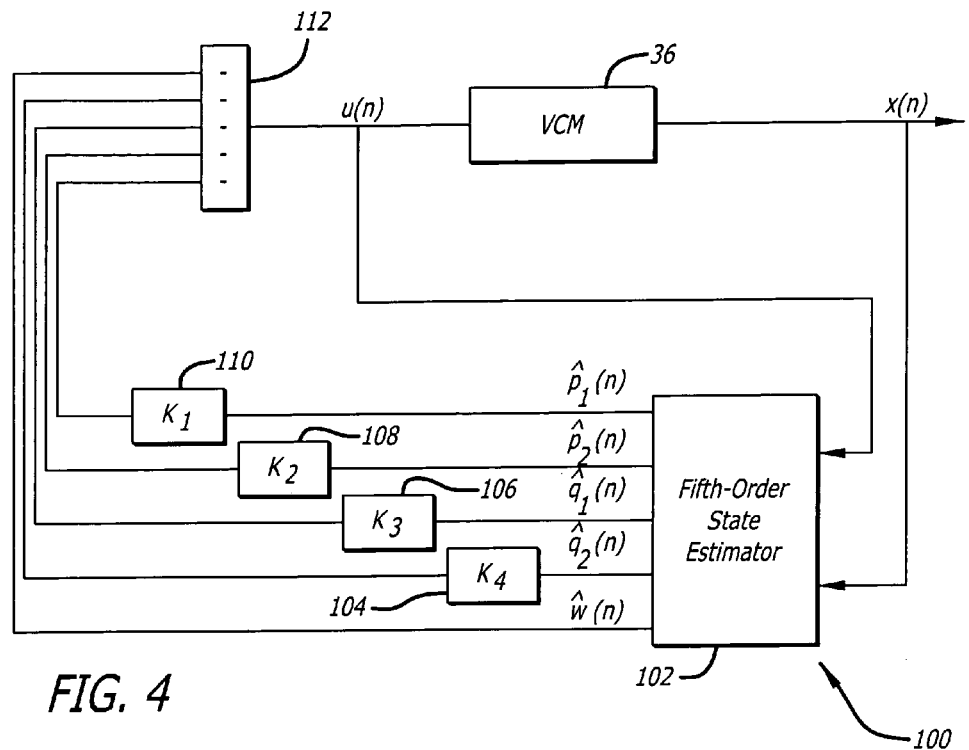
FIG. 4 is a schematic of a servo for the hard disk drive.

FIG. 4 shows a schematic of a servo system 100 used to perform a servo operation that centers the heads on the tracks of the disk. The servo is typically performed by the controller 64. The servo system 100 includes a fifth order estimator 102 that calculates five different estimates $\hat{p}_1(n)$, $\hat{p}_2(n)$, $\hat{q}_1(n)$, $\hat{q}_2(n)$ and $\hat{w}(n)$. The estimates $\hat{p}1(n)$, $\hat{p}2(n)$, $\hat{q}1(n)$ and $\hat{q}2(n)$ can be multiplied by feedback gains $K_1$, $K_2$, $K_3$ and $K_4$ in blocks 104, 106, 108 and 110, respectively. The estimates are combined by an adder 112 to create a control signal u(n) that is provided to the voice coil motor 36. The control signal provides a current that moves the voice coil motor 36.

A head position y(n) is periodically measured every sampling period $T_s$. There is typically a delay time $T_d$ between the measured head position and the computation of a state position value x(n). The state value x(n) and predicted values for the state position value x(n+1) values at a next sample time can be computed from the following equations:

$$x(n+1) = A_d x(n) + B_d u(n) \quad (1)$$

$$y(n) = C_d x(n) + D_d u(n-1) \quad (2)$$

$A_d$, $B_d$, $C_d$ and $D_d$ can be computed from the following equations:

$$A_d = e^{A_c T_s}, B_d = \int_0^{T_s} e^{A_c \tau} B_c d\tau, C_d = C_c e^{-A_c T_d}, D_d = -C_c \int_0^{T_d} e^{-A_c \tau} B_c d\tau \quad (3)$$

Figure 5:
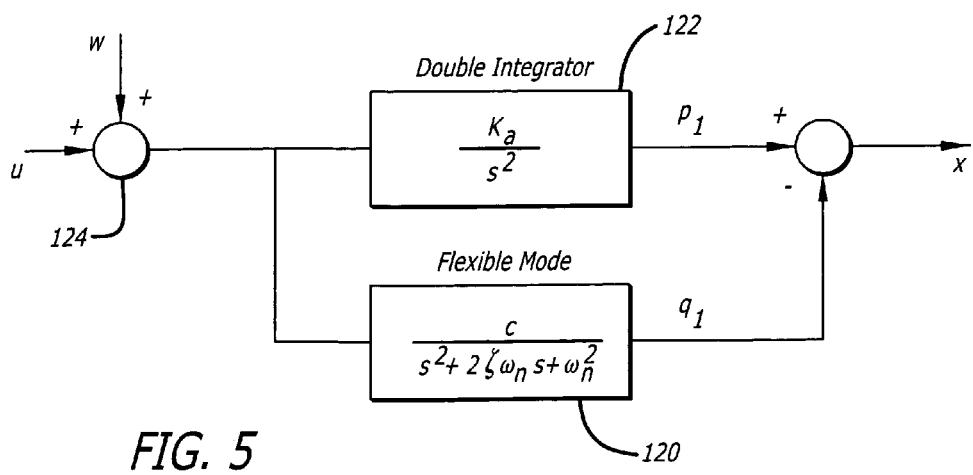
FIG. 5 is a schematic for a model voice coil motor plant that incorporates a flexible mode of the voice coil motor.

$A_c$, $B_c$, and $C_c$ can be derived from the equations and matrices of a classical voice coil motor model that incorporates a flexible mode of the voice coil motor. The plant model that incorporates a flexible mode is shown in FIG. 5 and includes the flexible mode 120 and a double integrator 122. The model also includes an adder 124 that receives the control input u and a disturbance w. The flexible mode parameters can be computed by fitting the ideal model with a measured model using a least square fit technique. The parallel VCM model can be written in state space form as:

$$\dot{x}(t) = A_c x(t) + B_c u(t) \quad (4)$$

$$y(t) = C_c x(t)$$

where state x and some matrices are defined by:

$$x = \begin{bmatrix} p_1 \\ p_2 \\ q_1 \\ q_2 \\ w \end{bmatrix} \quad (5)$$

$$A_c = \begin{bmatrix} 0 & 1 & 0 & 0 & 0 \\ 0 & 0 & 0 & 0 & K_a \\ 0 & 0 & 0 & 1 & 0 \\ 0 & 0 & -\omega_n^2 & -2\zeta\omega_n & c \\ 0 & 0 & 0 & 0 & 0 \end{bmatrix}$$

$$B_c = \begin{bmatrix} 0 \\ K_a \\ 0 \\ c \\ 0 \end{bmatrix}$$

$$C_c = [1 \quad 0 \quad -1 \quad 0 \quad 0]$$

The variables $p_1$ and $q_1$ are associated with head position x and the relation can be written as:

$$x = p_1 - q_1 \quad (6)$$

The other two state variables $p_2$ and $q_2$ are associated with head velocity v and the relation can be written as:

$$v = \dot{p}_1 - \dot{q}_1 = p_2 - q_2 \quad (7)$$

A state estimator for estimating position, velocity, and bias can be described at a discrete-time model by:

$$\hat{x}(n) = \bar{x}(n) + L[y(n) - C_d \bar{x}(n) - D_d u(n-1)] \quad (8)$$

$$\bar{x}(n+1) = A_d \hat{x}(n) + B_d u(n) \quad (9)$$

L is an estimation gain vector and the vectors $\hat{x}(n)$ and $\bar{x}(n)$ are estimated state and a predicted state at a current sample. The vector $\bar{x}(n+1)$ denotes a predicted state for a next sample. The control law is the feedback of a linear combination of all state estimates, that is:

$$u(n) = -K\hat{x}(n) = -[K_1 \quad K_2 \quad K_3 \quad K_4 \quad 1] \begin{bmatrix} \hat{p}_1(n) \\ \hat{p}_2(n) \\ \hat{q}_1(n) \\ \hat{q}_2(n) \\ w(n) \end{bmatrix} \quad (10)$$

The combined controller-estimator system can be found with the input being y(n) and output u(n). The combined system can be accomplished by initially combining equations (9) and (10):

$$\bar{x}(n+1) = (A_d - B_d K)\hat{x}(n) \quad (11)$$

Substituting equation (7) into equation (11) yields:

$$\bar{x}(n+1) = (A_d - B_d K)(I - LC_d) \bar{x}(n) - (A_d - B_d K)LD_d u(n-1) + (A_d - B_d K)Ly(n) \quad (12)$$

Substituting equation (7) into equation (9) produces:

$$u(n) = -K(I - LC_d)\bar{x}(n) + KLD_d u(n-1) - KLy(n) \quad (13)$$

A previous control input u(n−1) can be chosen as additional state variable to derive the following system in state space form.

$$\begin{bmatrix} \bar{x}(n+1) \\ u(n) \end{bmatrix} = \begin{bmatrix} (A_d - B_d K)(I - LC_d) & -(A_d - B_d K)LD_d \\ -K(I - LC_d) & KLD_d \end{bmatrix} \begin{bmatrix} \bar{x}(n) \\ u(n-1) \end{bmatrix} + \begin{bmatrix} (A_d - B_d K)L \\ -KL \end{bmatrix} \quad (14)$$

$$u(n) = [-K(I - LC_d) \quad KLD_d] \begin{bmatrix} \bar{x}(n) \\ u(n-1) \end{bmatrix} - KLy(n)$$

K and L can be found using random neighborhood search (RNS) method known in the art. The control signal u(n) computed from the equations (14) is used to drive the voice coil motor and move the heads of the drive across the disk. The control signal is updated and changed each sample period.

Figure 6:
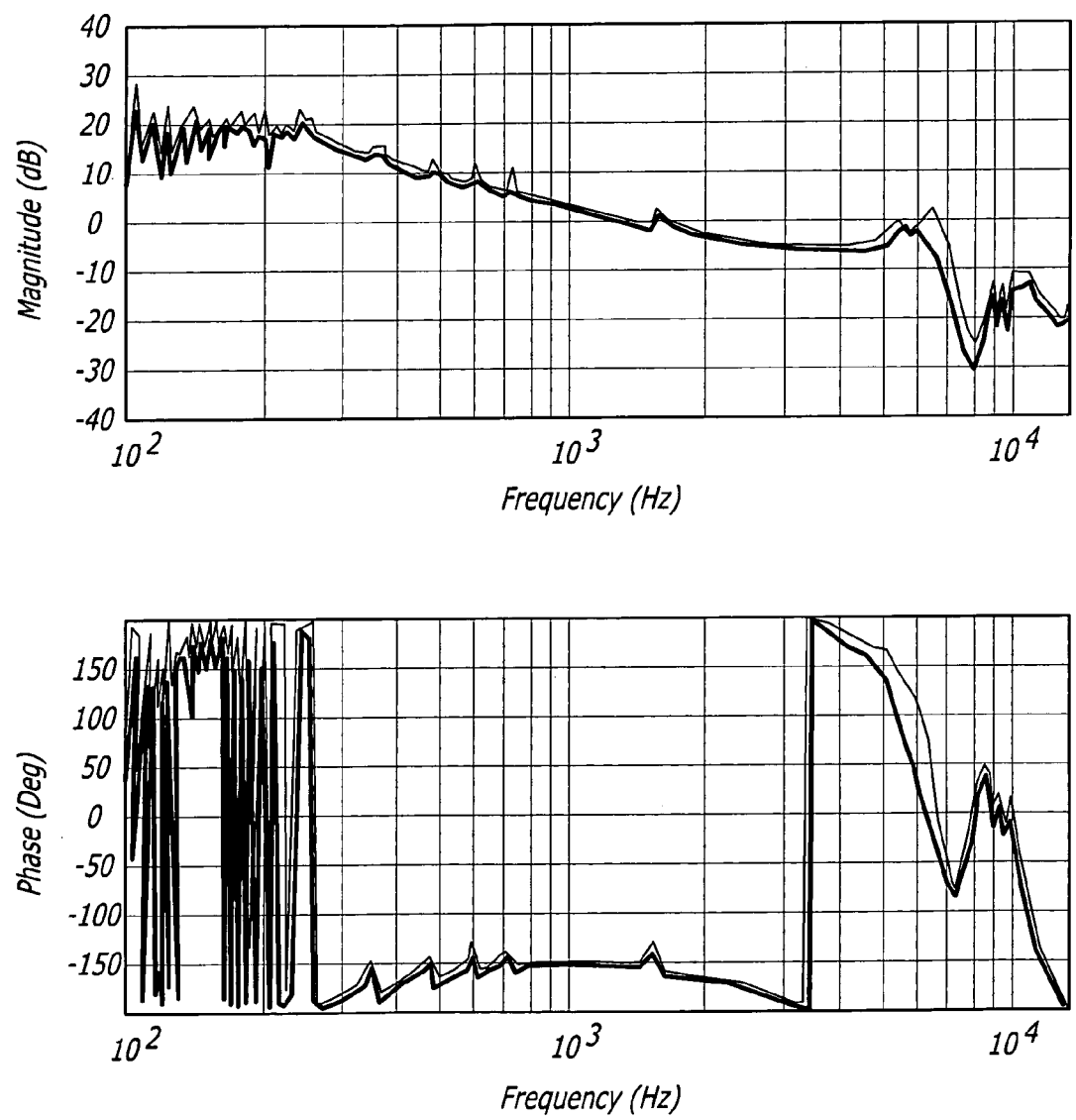
FIG. 6 are graphs that compare a fifth order estimator with a third order estimator of the prior art.

FIG. 6 shows a comparison between a disk drive operating with a third order estimator and a fifth order estimator. The graphs show an increase in frequency bandwidth with only a slight loss of stability.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
a disk that has at least one disk track;
a head coupled to said disk;
an actuator arm coupled to said head;
a voice coil motor coupled to said actuator arm; and,
a servo circuit that provides a control signal to said voice coil motor to perform a servo to align said head with said disk track, said servo circuit including a fifth order state estimator that calculates five estimates that are used to create said control signal, said estimates include a pair of head position estimates and a pair of head velocity estimates.

2. The hard disk drive of claim 1, wherein said five estimates are combined to create said control signal.

3. The hard disk drive of claim 1, wherein two of said estimates relate to a head position and two of said estimates relate to a head velocity.

4. The hard disk drive of claim 1, wherein said fifth order estimator incorporates a first flexible mode of said voice coil motor to calculate said estimates.

5. The hard disk drive of claim 1, wherein said servo circuit includes a controller.

6. The hard disk drive of claim 5, wherein said servo means includes a controller.

7. A hard disk drive, comprising:
a disk that has at least one disk track;
a head coupled to said disk;
an actuator arm coupled to said head;
a voice coil motor coupled to said actuator arm; and,
servo means for providing a control signal to said voice coil motor to perform a servo to align said head with said disk track, said servo means including a fifth order state estimator that calculates five estimates that are used to create said control signal, said estimates include a pair of head position estimates and a pair of head velocity estimates.

8. The hard disk drive of claim 7, wherein said five estimates are combined to create said control signal.

9. The hard disk drive of claim 7, wherein two of said estimates relate to a head position and two of said estimates relate to a head velocity.

10. The hard disk drive of claim 7, wherein said fifth order estimator incorporates a first flexible mode of said voice coil motor to calculate said estimates.

11. A method for performing a servo in a hard disk drive, comprising:
providing a control signal to a voice coil motor to move a head relative to a disk track of a disk;
calculating five estimates with a fifth order estimator, said estimates include a pair of head position estimates and a pair of head velocity estimates; and,
changing the control signal based on the five estimates.

12. The method of claim 11, wherein the five estimates are combined to create the control signal.

13. The method of claim 12, wherein two of the estimates relate to a head position and two of the estimates relate to a head velocity.

14. The method of claim 11, wherein the fifth order estimator incorporates a first flexible mode of the voice coil motor to calculate the estimates.

* * * * *